United States Patent [19]
Perren

[11] 4,322,721
[45] Mar. 30, 1982

[54] SELF-MONITORING WARNING INSTALLATION

[76] Inventor: Benno Perren, Austrasse 33, 5430 Wettingen, Switzerland

[21] Appl. No.: 167,478

[22] Filed: Jul. 11, 1980

[30] Foreign Application Priority Data

Aug. 15, 1979 [CH] Switzerland .................. 7473/79

[51] Int. Cl.³ .................... G08B 13/18; G08B 17/06; G08B 19/00
[52] U.S. Cl. .................................. 340/521; 340/507; 340/556; 340/550; 340/594
[58] Field of Search ............... 340/556, 555, 600, 529, 340/512, 507, 573, 540, 550, 594, 619, 521, 309.1

[56] References Cited

U.S. PATENT DOCUMENTS

| | | | |
|---|---|---|---|
| 2,903,681 | 9/1959 | Robbins | 340/521 |
| 3,444,544 | 5/1969 | Pearson et al. | 340/521 |
| 3,509,359 | 4/1970 | Embling | 340/507 |
| 3,914,753 | 10/1975 | Cho | 340/556 |
| 4,038,650 | 7/1977 | Evans et al. | 340/619 |
| 4,159,420 | 6/1979 | Tsunoda | 340/619 |
| 4,275,294 | 6/1981 | Davidson | 340/555 |

Primary Examiner—Glen R. Swann, III
Attorney, Agent, or Firm—Werner W. Kleeman

[57] ABSTRACT

Conventional warning installations possess electrically interrogated feelers or sensors or generate electrical signals, particularly if they are used for remote monitoring purposes. At the feelers and even more so at the signal lines it is possible for there to be produced spurious signals due to electrostatic charges or electrical or magnetic induction. These spurious signals trip unwarranted warning or alarm signals. The novel warning or alarm installation therefore contains an optical conductor or guide as a signal line, and the feelers are interrogated by means of optical signals. The optical conductor together with an electronic monitoring circuit forms a free-running opto-electronic oscillator which comes to standstill when there is interrupted the oscillating optical signal which is irradiated into the optical conductor and radiated back out of the conductor into the circuit. An alarm or warning circuit associated with the monitoring circuit generates an alarm signal when the opto-electronic oscillator comes to standstill.

13 Claims, 6 Drawing Figures

SELF-MONITORING WARNING INSTALLATION

CROSS-REFERENCE TO RELATED CASES

This application is related to my copending U.S. application Ser. No. 140,248, filed Apr. 14, 1980, and the therein mentioned copending applications.

BACKGROUND OF THE INVENTION

The present invention relates to a new and improved construction of a self-monitoring warning or alarm installation containing a monitoring circuit and an alarm or warning circuit.

Alarm installations are used in those environments where there is monitored a variable magnitude or parameter and when there should be indicated that such variable magnitude has fallen below or exceeded a predetermined threshold. Typical examples are installations for monitoring the terminal position of displaceable machine components, the temperature or the concentration of combustion gases in rooms, the degree of filling of vessels or containers, the subjecting to jarring or damage of building openings or the deformation or displacement of terrain formations and structural walls.

A first group of heretofore known warning or alarm installations contains passive feelers which are affected by the magnitude or parameter which is to be monitored. These feelers are connected by means of an electrical signal line with an electronic monitoring circuit. This monitoring circuit periodically interrogates the state of the feeler and produces an alarm signal when this state or condition no longer is within a predetermined region or range.

A second group of prior art installations contain active feelers which are equipped with a related energy source or are connected with a central energy source. These feelers generate a signal as soon as the monitored magnitude has fallen below or exceeded a predetermined threshold. This signal again is transmitted by means of an electrical signal line to a central monitoring circuit. With a number of design constructions of such installations there is used the same electrical line or conductor for the infeed of the electrical energy to the feeler and for the return of the monitoring signal to the monitoring circuit. Alarm or warning installations are preferably structured as self-monitoring installations, generating a display or indicator signal when parts of the installation no longer are functional.

The heretofore known installations possess, independently of the special constructional embodiments and fields of applications, a number of basic defects. The cause of such defects or flaws are the use of feelers or sensors which are electrically interrogated or themselves generate electrical signals and the electrical signal lines needed for the interrogation and further transmission of the signals. Spurious signals can be induced in such feelers and the lines due to external electrical or magnetic fields. These spurious signals impair the proper functioning of the installation or can trip false alarms. In order to eliminate these defects it is necessary to electrostatically screen the feelers and lines. The procedure is expensive and not possible for many feelers without impairing their function. Moreover, electrical feelers or sensors and signal lines are not permissible in an explosion-endangered environment, although it is exactly at such locations that there is particularly needed the monitoring of different operating magnitudes.

SUMMARY OF THE INVENTION

Therefore, with the foregoing in mind it is a primary object of the present invention to provide a new and improved construction of alarm or warning installation which is not associated with the aforementioned drawbacks and limitations of the prior art proposals.

Another and more specific object of the present invention aims at providing a new and improved construction of a self-monitoring warning or alarm installation whose feelers do not require any electrical supply voltage and whose signal line is suitable for transmission of non-electrical signals.

A still further significant object of the present invention aims at providing a new and improved construction of self-monitoring warning or alarm installation which is relatively simple in construction and design, extremely reliable in operation, not readily subject to breakdown or malfunction, and requires a minimum of maintenance and servicing.

Now in order to implement these and still further objects of the invention, which will become more readily apparent as the description proceeds, the warning or alarm installation of the present development is manifested by the features that the monitoring circuit is structured as a free-running opto-electronic oscillator containing a light-emitting diode as the transmitter, a flexible optical conductor or guide as the transmission line or conductor and a photodiode as the receiver for the oscillating monitoring signal. The warning or alarm circuit contains at least one monoflop, whose signal input is connected with the monitoring circuit and which is switched by the monitoring signal into an unstable switching state. The oscillation frequency of the monitoring signal is greater than the flop frequency of the monoflop or monostable multivibrator, which thus remains in its unstable switching state as long as its signal input has infed thereto an oscillating monitoring signal and moves or flops into the stable switching state as soon as the monitoring signal has been interrupted.

The novel warning installation of the present development does not contain any electrical power or supply lines, which particularly constitute a potential source of danger in explosion-endangered environments, and at the optical conductor there practically cannot be introduced any spurious signals. The new and improved alarm installtion of the invention therefore enables attaining a heretofore unattainable operational reliability. Moreover, with the novel installation the optical conductor is employed for the self-monitoring signal and, at the same time, for the indicator or display signal of the feeler or feelers, rendering possible an extremely simple and economical construction of the entire installation. In fact it is even possible to operate the installation without any special feelers and to use the optical conductor or line as a feeler, which then interrupts the further transmission of the monitoring signals or attenuates the same to such a degree that there is triggered the alarm signal.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
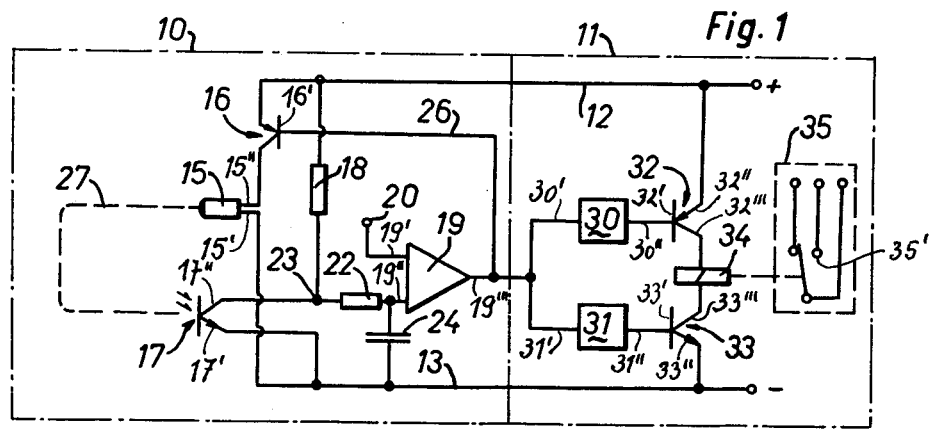
FIG. 1 is a principle circuit diagram of a monitoring circuit and alarm circuit suitable in particular for use in the novel self-monitoring alarm installation of the invention.

Describing now the drawings, in FIG. 1 there is illustrated the principle circuit diagram of a preferred exemplary embodiment of monitoring circuit 10 and alarm or warning circuit 11, which are extremely well suited for the novel self-monitoring alarm installation. Both of the circuits 10 and 11 are connected with a common power supply, here shown as the supply voltage lines 12, 13. The monitoring circuit 10 contains a light-emitting diode 15, whose one terminal or connection 15' is directly coupled with the power supply line 13 and whose other terminal or connection 15" is connected by means of a switching transistor 16 with the power supply line 12. This monitoring circuit 10 further contains a photodiode 17, whose one terminal 17' is directly connected with the power supply line 13 and whose other terminal 17" is connected by means of a series resistance 18 with the power supply line 12. This monitoring circuit 10 additionally contains a comparator 19, whose non-inverting input 19' is connected with a reference voltage source 20 and whose inverting input 19" is connected by means of a resistance or resistor 22 with the node or connection point 23 between the photodiode 17 and the related series resistance 18. The inverting input 19" of the comparator 19 is connected by means of a capacitor 24 with the line 13 of the power supply system 12, 13. Leading from the output side 19'" of the comparator 19 is a line 26 to a control electrode 16' of a transistor 16 connected in series with the light-emitting diode 15. Finally, also belonging to the monitoring circuit 10 is an optical conductor or guide 27 which extends from the light-emitting diode 15 to the photodiode 17 and which is preferably constructed as a flexible glass fiber or fibers.

In order to describe the function of this monitoring or monitor circuit 10, it is assumed that the reference voltage source 20 is set at a value which is between that of both supply voltage lines 12, 13 and that upon turning-on the supply voltage the switching transistor 16 conducts current, so that the light-emitting diode 15 is excited and light is irradiated into the optical conductor 27. The light effluxing out of the optical conductor 27 then illuminates the photodiode 17, whose internal resistance is thus reduced. As a result, the voltage at the connection point or node 23 and thus also at the inverting input 19" of the comparator 19 drops to a value which is smaller than the reference voltage or potential, so that at the output 19'" of the comparator 19 there appears a positive signal. This positive signal is conducted by means of the line 26 to the control electrode 16' of the switching transistor 16, which is therefore blocked. Due to blocking of the switching transistor 16 the light-emitting diode 15 is now without current and the emission of light is interrupted. Hence, also the illumination of the photodiode 17 is interrupted, which, in turn, results that its internal resistance, and therefore, also the potential at the connection point or node 23 increases. As soon as the potential at the connection point 23, and thus, also at the inverting input 19" of the comparator 19 exceeds the reference potential or voltage, there appears at the output side or output 19'" of the comparator 19 a negative signal, which again places the transistor 16 into its conductive state.

In this way the light-emitting diode 15 is periodically excited or energized and again turned-off, so that the frequency of this periodic turning-off and turning-on operation as concerns the light-emitting diode 15 is essentially governed by the time constant of the RC-element 22, 24 arranged in circuit with the inverting input 19" of the comparator 19.

Continuing, the alarm or warning circuit 11 contains two monostable multivibrators or monoflops 30 and 31, whose respective signal inputs 30' and 31' are connected with the output 19'" of the comparator 19 of the monitoring circuit 10. Both of the multivibrators 30 and 31 are in a stable switching state when the signal at the control signal input is null or negative and are switched into an instable state by a positive control signal. The output 30" and 31" of each related multivibrator 30 and 31 is connected with the control input 32' and 33' of the respective related switching transistors 32 and 33. The one switching transistor 32 is a pnp-transistor, whose emitter 32" is connected with the positive bus of the power supply line 12, and the other switching transistor 33 is a npn-transistor, whose emitter 33" is connected with the negative bus of the power supply line 13. In the connection line between the collector 32'" of the one transistor 32 and the collector 33'" of the other transistor 33 there is arranged an excitation coil or winding 34 of a relay 35. The contacts 35' of this relay are used for switching a not particularly illustrated but conventional optical or acoustical warning device.

Now for the coaction of this warning or alarm circuit 11 with the above-described monitoring circuit 10 the flop time of both multivibrators 30 and 31 is adjusted such that this flop time is longer by a factor of about ten than the period of the monitoring circuit 10. With a practically tested exemplary embodiment the frequency of the oscillations of the monitoring circuit 10 amounted to about 20 to 100 Hz, the flop time of the multivibrators to about 0.1 to 0.5 seconds. In the non-energized stable state there appears at the output 30" of the one multivibrator 30 connected with the pnp-transistor 32 a positive output signal and at the output 31" of the other multivibrator 31 connected with the npn-transistor 33 a negative output signal.

As long as the monitoring circuit 10 oscillates in the above-described manner, then there appears at the output 19'" of the comparator 19 an uninterrupted pulse train which is infed to the control signal inputs 30' and 31' of both monostable multivibrators or monoflops 30 and 31, respectively, and switches such into their unstable state. Then there appears at the output 30" of the one multivibrator 30 a negative signal and at the output 31" of the other multivibrator 31 a positive signal, these signals switching the related pnp-transistor 32 and npn-transistor 33 into their conductive states, so that current flows through the relay winding 34 and there is made contact at one or the other of the relay contacts 35'. Because the flop time of the multivibrators 30 and 31 is greater than the pulse train frequency of the pulse signal train, the multivibrators 30 and 31 remain in their energized unstable condition or state for such length of time as there are infed to their inputs 30' and 31' the pulse signal train. As soon as there has been interrupted the oscillation of the monitoring circuit 10 and independently of whether such interruption arises due to failure of the power supply voltage or one of the electrical components, or due to an interruption or breaking of the optical conductor 27 or an interruption in the transmission of the optical signals by a feeler arranged in the signal line, both of the multivibrators 30 and 31 fall back into their stable switching state. Then there appears at the output 30" of the one multivibrator 30 a positive output signal, which blocks the related pnp-transistor 32, and at the output 31" of the other multivibrator 31 there appears a negative output signal which blocks the related npn-transistor 33. Both of the transistors 32 and 33 then interrupt the current flow through the winding 34 of the relay 35, so that the contact or contacts 35a thereof are interrupted and there is turned-on the excitation circuit for the alarm device.

Figure 2:
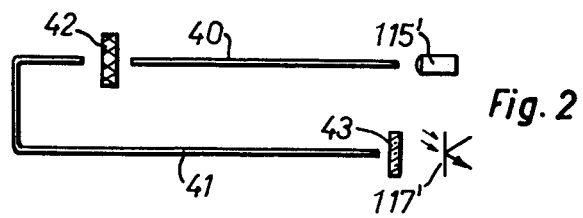
FIG. 2 schematically illustrates a signal line having an optical transducer.

FIG. 2 schematically illustrates a bipartite or two-part signal line 40, 41 containing a first optical partial line 40 and a second optical partial line 41. The first optical partial line 40 leads from a light-emitting diode 115' to a light transducer 42, while the second optical partial line 41 leads from the light transducer 42 to a photodiode 117'. Between the end of the second optical partial line 41 and the photodiode 117' there is arranged an optical filter 43.

During operation of this signal line 40, 41 the light emitted by the light-emitting diode 115' is converted by the light transducer 42 into light of a different wavelength, and there is used a photodiode 117' which is energized by the light of the light transducer or converter 42, but not by the light of the light-emitting diode 115'. Light transducers or converters suitable for this purpose are commercially available and well known and, for instance, can be purchased under the designation IR-converter screen Type IRW 2525. The use of a light transducer or converter 42 in the single line 40, 41 prevents interruption of the line by an unintentional or intentional optical shunt connection between the light-emitting diode and the photodiode, thereby appreciably increasing the reliability and operational integrity of the alarm installation.

It should be understood that between the light-emitting diode 115' and the neighboring end surface of the first optical partial line 40, just as between both surfaces of the light converter or transducer 42 and the outlet end of the second partial line 41 and the photodiode 117' there are advantageously arranged optical imaging systems insuring for an optimum optical coupling between these components. Such systems are well known to those skilled in the art and therefore need not here be further described.

With the novel warning or alarm installation the alarm signal is triggered as soon as the optical coupling between the light-emitting diode and the photodiode is markedly weakened or interrupted. This condition can be reached in that the signal line is directly interrupted or by means of a feeler which is incorporated into such line and which feeler, if desired, can be reset, or the transmission quality of the optical line varies at least throughout a limited length region.

Figure 3:
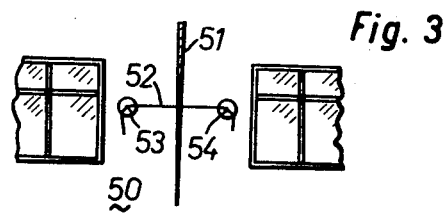
FIG. 3 schematically illustrates a signal line used for monitoring a break or fissure at a wall or structure.

FIG. 3 schematically illustrates the signal line 52 of an alarm installation which is used for monitoring the change of a wall fissure 51 and which generates an alarm or warning signal when the enlargement of such wall fissure or break exceeds the elongation of the signal line 52 and tears the same. To this end, the signal line 52 is spanned over the fissure in the wall 50 and secured by suitable attachment elements 53 and 54 at the wall. As soon as through enlargement of the wall fissure or break the signal line 52 is ruptured, then, as described above in detail, there is interrupted the oscillation of the free-wheeling optoelectronic oscillator and the alarm signal is triggered.

It should be understood that the same principle can be applied to other fields of application, for instance for monitoring the bending through or hang of highly loaded bridges, the shifting of earth dams, slide-endangered slopes and excavations, fillings and so forth.

The described inventive principles can be utilized to particular advantage for security installations for monitoring closed rooms or areas or containers. With such security installations the signal line is laid in a wall or the door of the room which is to be monitored or the container or the like, as the case may be, such that upon forceful breaking through the wall or opening the door the signal line will be torn or broken. As already previously explained, there are already known appropriate alarm installations utilizing an electrical line as the signal line. In contrast to the state-of-the-art installations, with the herein disclosed novel alarm installation, it is not possible to induce in the signal line spurious signals or to short-circuit the line loop or circuit, particularly if it contains a light transducer or converter according to the embodiment discussed above with reference to FIG. 2.

Figure 4:
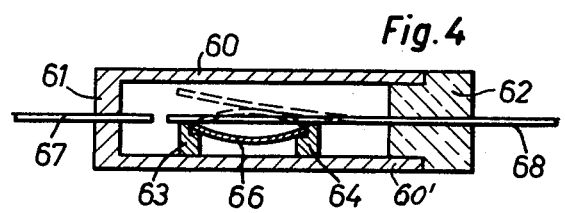
FIG. 4 is a sectional view through a first simple constructional embodiment of a feeler used for temperature monitoring.

FIG. 4 shows in sectional view an extremely simplified construction of a resettable temperature feeler which is installed in the signal line. The temperature feeler, upon exceeding a predetermined temperature, interrupts the further transmission of a monitoring signal. The housing 60' of this feeler or sensor comprises a substantially cylindrical housing wall 60 at which there is formed a floor portion 61 and a fitted stopper or plug 62. At the inner surface of the housing wall 60 there are secured two bearing blocks 63 and 64 or equivalent structure, upon which there is movably retained a bimetallic strip 66. This bimetallic strip 66 is cut from a spherical-shaped bimetallic snap disk and therefore has a defined jump temperature. At the base or bottom portion 61 of the housing 60' there is retained the free end of a first glass fiber 67 and at the stopper or plug 62 the free end of a second glass fiber 68. The end surfaces of both of the glass fibers 67 and 68 are quite close to and in alignment with one another, so that the light effluxing out of the one glass fiber enters for the most part the other glass fiber. The glass fibers 67, 68 constitute a light conductor or light conductor means.

The housing wall 60 comprises a good thermally conductive material or has a multiplicity of perforations, so that the temperature in the internal space of the housing 60' practically corresponds to the ambient temperature. When this temperature increases and the predetermined surge or jump temperature of the bimetallic strip 66 is exceeded, then the latter assumes the phantom line position and thus deflects the free end of the thereat bearing glass fiber 68, so as to assume the position shown in broken lines at FIG. 4. In this position there is interrupted the further conductance of light between both of the glass fibers 67, 68 of the light conductor.

Figure 5:
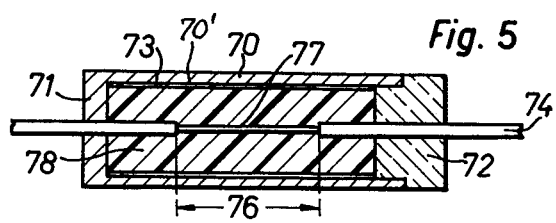
FIG. 5 is a sectional view through a second simple embodiment of a feeler used for temperature monitoring.

FIG. 5 illustrates a feeler or sensor which is suitable for use with the novel alarm installation of the present invention, this feeler being constructed as part of the optical conductor and serving to change the transmission quality of such conductor. The feeler contains a substantially cylindrical housing 70 having a base or bottom portion 71 formed thereat and a closure cap 72. The housing inner wall 70' is provided with a black lining or covering 73. The optical signal line is constructed as a glass fiber 74, and the housing 70 is placed over a region 76 of this glass fiber 74 where the fiber sheath has been removed and there is freely exposed the fiber core 77. The not particularly referenced internal space of the housing 70 is filled with a fine crystaline wax 78 having a white appearance in its solidified state, this wax having a predetermined solidification point.

As long as the temperature of the feeler is below the solidification temperature of the wax, then the signal light emanating from the core 77 of the glass fiber 74 is reflected for the most part back to the core 77. In this way the signal light is only gradually attenuated, and the sensitivity of the signal receiver of the monitoring circuit can be set without any particular measures such that the loss in signal intensity of the free-wheeling oscillator is not impaired. As soon as the ambient temperature of the feeler ascends beyond the solidification temperature of the wax 78 and the latter melts and becomes transparent, then the light effluxing out of the fiber core 77 arrives at the black lining or covering 73 where such light is absorbed. In this way the signal light is attenuated to such a degree that the function of the oscillator at the monitoring circuit is interrupted and there is triggered the alarm signal.

Figure 6:
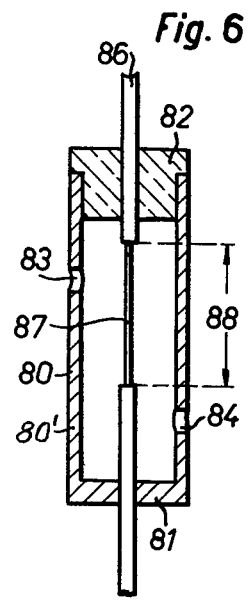
FIG. 6 is a sectional view through a simple constructional embodiment of a feeler utilized for level monitoring.

FIG. 6 illustrates a further embodiment of a feeler, by means of which there can be altered the transmission quality of the signal line or conductor. This feeler contains a housing 80 having a base or floor portion 81 formed thereat and a closure cap 82. The cylindrical housing wall 80' contains a number of relatively large perforations 83, 84. Extending through the housing base portion 81 and the closure cap or cover 82 is an optical line or conductor constructed as a glass fiber 86. The fiber sheath or jacket has been detached within the internal space of the housing 80 along a region 88, so that there is freely exposed the fiber core 87.

This construction of feeler is contemplated to be used as a level indicator for liquids. Through suitable selection of the material of the fiber core, as is well known to any one skilled in the art, it is possible to attain the result that the signal light remains predominantly within the fiber core 87 as long as the inner chamber or space of the feeler is filled with air and predominantly escapes out of the fiber core 87 as soon as such internal space or chamber is filled with the liquid which is to be monitored.

It is also possible to use such signal lines whose transmission quality can be directly altered by a magnitude or parameter which is to be monitored, without there being required for this purpose a special feeler or sensor. An example of such signal line is an optical fiber where at least the fiber sheath of jacket consists of an organic polymer which decomposes at a predetermined temperature, and thus, forms a black layer which absorbs the signal light. Such fiber is an optimum temperature alarm which is temperature sensitive throughout its entire length, and thus, is independent of locally distributed temperature feelers or sensors.

It should be understood that the novel installation can be accommodated to different special operating conditions and can be appropriately modified. For instance, it is possible to use instead of a light-emitting diode also a metallic filament lamp or a laser light source and instead of a single optical fiber there can be used a bundle of fibers, wherein the material of the fiber or fibers is appropriately selected in accordance with the wavelength of the light to be transmitted. Between the light source and the light receiver and the associated ends of the optical conductor there can be used optical systems which optimumly couple and decouple the light into and from the conductor. Finally, it is also possible to construct the alarm circuit with only one multivibrator and a subsequently connected transistor, without thereby impairing its function.

The described exemplary embodiments of novel alarm installations can be constructed of commercially available electronic and optical elements, and thus, these need not be here further described.

While there are shown and described present preferred embodiments of the invention, it is to be distinctly understood that the invention is not limited thereto, but may be otherwise variously embodied and practiced within the scope of the following claims. accordingly,

What I claim is:

1. A self-monitoring alarm installation, comprising:
    a monitoring circuit;
    an alarm circuit operatively connected with said monitoring circuit;
    said monitoring circuit being structured as a free-running opto-electronic oscillator;
    said monitoring circuit comprising:
        a light-emitting diode constituting a transmitter;
        a flexible optical conductor constituting a conductor; and
        a photodiode serving as a receiver for an oscillating monitoring signal;
    said alarm circuit comprising:
        at least one monostable multivibrator having a signal input;
        said signal input being connected with said monitoring circuit;
        said monostable multivibrator being switched by said monitoring signal into an unstable switching state;
        said monitoring signal having an oscillation frequency greater than the flop frequency of the monostable multivibrator,
        so that said monostable multivibrator remains in its unstable switching state as long as its signal input has infed thereto an oscillating monitoring signal and flops into its stable switching state as soon as the monitoring signal is interrupted.

2. The alarm installation as defined in claim 1, wherein:
    said monitoring circuit further comprises:
        a transistor connected in series with said light-emitting diode;
        a resistance connected in series with said photodiode;
        a comparator having an inverting input and a non-inverting input;
        an adjustable reference potential means connected with said non-inverting input of said comparator;

said photodiode and resistance being connected with one another at a connection point;
said inverting input of said comparator being connected with said connection point between the photodiode and resistance;
said comparator having an output;
said transistor have a control electrode; and
said output of said comparator being connected with said control electrode of said transistor.

3. The alarm installation as defined in claim 2, further including:
an RC-element the resistor of which is connected between said connection point and said inverting input of said comparator; and
said RC-element controlling the frequency of the free-running opto-electronic oscillator.

4. The alarm installation as defined in claim 1, wherein:
said alarm circuit further contains:
a relay having an excitation winding;
at least one switching transistor;
power supply means;
said excitation winding of said relay being connected by said at least one switching transistor with said power supply means;
said monostable multivibrator having an output connected with a control electrode of the related switching transistor; and
said monostable multivibrator delivering an output signal when in its unstable switching state which switches the switching transistor into its conductive state, so that upon interruption of the monitoring signal and flopping of the monostable multivibrator into its stable switching state there is interrupted the excitation of said relay.

5. The alarm installation as defined in claim 1, wherein:
said optical conductor comprises loop means having a starting portion and an end; and
said starting portion of said loop means being optically coupled with said light-emitting diode and said end of said loop means with said photodiode.

6. The alarm installation as defined in claim 5, further including:
at least one light converter coacting with said optical conductor;
said light converter upon incidence of the light emitted by the light emitting diode irradiating a different wavelength and said photodiode being excited by the light of the light converter.

7. The alarm installation as defined in claim 1, wherein:
said optical conductor contains at least one sensor for a magnitude which is to be monitored; and
said sensor serving to interrupt further transmission of the optical monitoring signal when the magnitude to be monitored ascends beyond a predetermined value or drops below a predetermined value.

8. The alarm installation as defined in claim 1, wherein:
said optical conductor is used as a sensor for the magnitude which is to be monitored.

9. The alarm installation as defined in claim 8, wherein:
said optical conductor is mechanically secured to at least two attachment elements experiencing changes in distance from one another in order to monitor such distance changes.

10. The alarm installation as defined in claim 1, wherein:
said optical conductor comprises a glass fiber having a core and a conductor sheath; and
said optical conductor being free at least at one region thereof of the conductor sheath in order to monitor changes in the reflection capability of its surroundings.

11. The alarm installation as defined in claim 1, wherein:
said optical conductor comprises a glass fiber having a core and a conductor sheath; and
said optical conductor being freed at least at one region thereof of the conductor sheath in order to monitor the optical refraction index of its surroundings.

12. The alarm installation as defined in claim 9, wherein:
said optical conductor possesses over a portion of its length a conductor sheath whose optical reflection capability experiences a change at a predetermined maximum temperature in order to monitor said maximum temperature.

13. The alarm installation as defined in claim 12, wherein:
said conductor sheath comprises an organic polymer.

* * * * *